(12) United States Patent
Young et al.

(10) Patent No.: US 9,264,878 B2
(45) Date of Patent: Feb. 16, 2016

(54) METHOD OF PROVIDING RATE TIERS IN WIRELESS COMMUNICATION SYSTEMS

(71) Applicant: Alcatel-Lucent U.S.A., Inc., Murray Hill, NJ (US)

(72) Inventors: Tomas S Young, Parsippany, NY (US); Ashok N Rudrapatna, Basking Ridge, NJ (US); Nandu Gopalakrishnan, Chatham, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/179,079

(22) Filed: Feb. 12, 2014

(65) Prior Publication Data

US 2014/0162593 A1    Jun. 12, 2014

Related U.S. Application Data

(62) Division of application No. 12/950,650, filed on Nov. 19, 2010, now Pat. No. 8,660,523.

(60) Provisional application No. 61/411,299, filed on Nov. 8, 2010.

(51) Int. Cl.
*H04M 11/00* (2006.01)
*H04W 4/24* (2009.01)
(Continued)

(52) U.S. Cl.
CPC ............. *H04W 4/24* (2013.01); *H04L 41/5029* (2013.01); *H04M 15/765* (2013.01);
(Continued)

(58) Field of Classification Search
CPC ....... H04W 4/24; H04W 24/08; H04W 28/16; H04L 41/142; H04L 41/5006; H04L 41/5029; H04M 15/765; H04M 15/7652; H04M 15/78

USPC .......................... 455/405, 406, 407, 408, 409
See application file for complete search history.

(56) References Cited

U.S. PATENT DOCUMENTS 6,836,653 B1    12/2004    Kang
7,174,156 B1 *   2/2007    Mangal ................. H04M 15/00
                                                       379/126

(Continued)

FOREIGN PATENT DOCUMENTS

JP    2001268274        9/2001
JP    2002315057 A    10/2002
WO    2009114923        9/2009

OTHER PUBLICATIONS

International Preliminary Report on Patentability and Written Opinion correlating to PCT/US2011/058223 dated May 14, 2013, 12 pages.

(Continued)

*Primary Examiner* — Khai M Nguyen
(74) *Attorney, Agent, or Firm* — Davidson Sheehan LLP (57) ABSTRACT

The present invention provides a method of providing rate tiers in a wireless communication system. Embodiments of the method include forming, at a network element in the wireless communication system, a statistical representation of resource usage for a user in the wireless communication system as a function of location and/or time using measurements of the user's resource usage at a plurality of locations. Embodiments of the method also include defining, at the network element, a plurality of rate tiers based on the statistical representation. Each rate tier indicates a rate for a different level of resource usage offered to the user.

11 Claims, 7 Drawing Sheets

(51) Int. Cl.
*H04M 15/00* (2006.01)
*H04L 12/24* (2006.01)
*H04W 24/08* (2009.01)
*H04W 28/16* (2009.01)

(52) U.S. Cl.
CPC ......... *H04M 15/7652* (2013.01); *H04M 15/78* (2013.01); *H04L 41/142* (2013.01); *H04L 41/5006* (2013.01); *H04W 24/08* (2013.01); *H04W 28/16* (2013.01)

(56) References Cited

U.S. PATENT DOCUMENTS

| | | | |
|---|---|---|---|
| 7,840,458 B2* | 11/2010 | Liu | H04W 12/06 455/403 |
| 2002/0016842 A1 | 2/2002 | Eki | |
| 2004/0185858 A1 | 9/2004 | Fattouch et al. | |
| 2005/0222955 A1 | 10/2005 | Ritter et al. | |
| 2006/0056333 A1 | 3/2006 | Ogura | |
| 2006/0072490 A1* | 4/2006 | McLaughlin | H04W 48/06 370/328 |
| 2006/0143027 A1 | 6/2006 | Jagannathan et al. | |
| 2007/0260540 A1 | 11/2007 | Chau et al. | |

OTHER PUBLICATIONS

Vijoy Pandey et al. "Exploiting User Profiles to Support Differentiated Services in Next-Generation Wireless Networks," Jul. 15, 2002, 9 pages.

Spyros Panagiotakis et al. "The LIAISON Customised Billing System for Charging Location-based Services," Sep. 3, 2007, 6 pages.

Ralph Kuhne et al. "A Mechanism for Charging System Self-Configuration in Next Generation Mobile Networks," May 21, 2007, 8 pages.

Moses Nkhumeleni, "Literature Survey: Investigation of billing principles and infrastructures for next generation services", May 10, 2010, 16 pages.

* cited by examiner

METHOD OF PROVIDING RATE TIERS IN WIRELESS COMMUNICATION SYSTEMS

CROSS REFERENCE TO RELATED APPLICATIONS

This application is a divisional application of U.S. patent application Ser. No. 12/950,650, entitled "METHOD OF PROVIDING RATE TIERS IN WIRELESS COMMUNICATION SYSTEMS" and filed on Nov. 19, 2010, the entirety of which is incorporated by reference herein, which claims priority to U.S. Provisional Patent Application 61/411,299, filed on Nov. 8, 2010.

BACKGROUND OF THE INVENTION

1. Field of the Invention

This invention relates generally to communication systems, and, more particularly, to wireless communication systems.

2. Description of the Related Art

Service providers typically provide numerous voice and/or data services to subscribers using one or more wired and/or wireless communication systems. Exemplary services include cellular telephony, access to the Internet, gaming, broadcasting or multicasting of audio and/or video, teleconferencing, multimedia programming, and the like. Mobile subscriber units such as cell phones, personal data assistants, smart phones, pagers, text messaging devices, global positioning system (GPS) devices, network interface cards, notebook computers, and desktop computers may access the services provided by the communication systems over an air interface with one or more base stations. Communication between mobile units and base stations are goverened by various standards and/or protocols, such as the standards and protocols defined by the $3^{rd}$ Generation Partnership Project (3GPP, 3GPP2).

Users can negotiate subscriptions and/or service plans with the service providers. A typical service plan is separated into different levels or tiers. For example, a user can subscribe to a basic level that allows a user access to a basic level of bandwidth, a certain amount of data, and/or a particular quality-of-service (or best effort service) for the services provided by the wireless communication system. Each user pays a basic flat rate monthly fee for the basic level of service. Users that expect to use more than the basic level of bandwidth or data, or require a higher quality-of-service, may subscribe to higher level plans. For example, a user that plans to spend a significant amount of time playing online games or using videoconferencing services may subscribe to a gold service plan that provides a higher level of bandwidth, data, and/or quality-of-service than the basic level. Users pay a higher premium price to subscribe to the higher level service plans.

The capacity of the wireless communication system can vary significantly over time and at different locations. Service providers therefore have difficulty predicting the actual bandwidth, throughput, and/or quality-of-service available to subscribers to the different tiers. Consequently, users' expectations are not always met by the current multi-tier service plans. For example, a user that pays a premium to subscribe to a gold service plan may expect seamless and uninterrupted service even when using services (such as gaming and video teleconferencing) that require significant resources such as bandwidth. Premium users may therefore be frustrated by interruptions and/or degraded quality when the user attempts to use resource-intensive applications at times or in locations where the required resources are scarce, e.g., due to low capacity of the system and/or high usage by other subscribers. These frustrated users may feel that they are not getting good value and may consider dropping the gold service plan and perhaps even switching service providers.

Service providers also have difficulty predicting resource usage of the different subscribers, at least in part because of the wide variety of services available to each subscriber and the idiosyncratic choices made by each subscriber. For example, one subscriber to a gold service plan may user a mobile phone exclusively for voice communication and may therefore use significantly fewer resources than another gold service plan subscriber that uses a smart phone for online gaming.

The inability of service providers to predict individual resource usage can reduce the actual capacity of the wireless communication system. For example, a conventional admission control algorithm assumes that each user requesting access to the system will utilize a predetermined amount of system resources, which may be referred to as a resource margin. The admission control algorithm will admit the requested call if the system can provide the assumed resource margin and will reject the requested call if it determines that it does not have sufficient resources to support the requested call. However, the estimated margin can be very inaccurate when the actual resource consumption of a particular user differs from the expected average resource usage. Admission control algorithms typically assume a relatively high (or worst-case) resource margin and so they tend to overestimate the resources required to support requested calls. Consequently, system capacity may be erroneously reduced, e.g., because calls that have relatively low resource consumption may be rejected because the resource margin for these calls has been overestimated.

SUMMARY OF EMBODIMENTS OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for determining rate tiers in a wireless communication system. Embodiments of the method include forming, at a network element in the wireless communication system, a statistical representation of resource usage for a user in the wireless communication system as a function of location and/or time using measurements of the user's resource usage at a plurality of locations. Embodiments of the method also include defining, at the network element, a plurality of rate tiers based on the statistical representation. Each rate tier indicates a rate for a different level of resource usage offered to the user.

In another embodiment, a method is provided for determining rate tiers in a wireless communication system. Embodiments of the method include receiving, at a network element in the wireless communication system, a request to admit a call from a user at a location. Embodiments of the method also include determining, at the network element, whether to admit the call using an estimate of a resource margin for the user at the location. The estimate is determined based on a statistical representation of resource usage for the user as a function of location. The statistical representation is determined using measurements of the user's resource usage at a plurality of locations.

In yet another embodiment, a method is provided for supporting rate tiers in a wireless indication system. Embodiments of the method include forming, at a network element in the wireless communication system, a statistical representation of resource usage for a plurality of users as a function of location and/or time by combining a plurality of individual statistical representations of resource usage for each user. Each individual statistical representation is determined using measurements of each user's resource usage at a plurality of locations. Embodiments of the method also include determining whether to modify resource capacity of the wireless communication system by comparing the statistical representation to a geographical distribution of resource capacity of the wireless communication system.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter is susceptible to various modifications and alternative forms, specific embodiments thereof have been shown by way of example in the drawing and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well know to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special means, i.e., a meaning other than that understood by skilled artisans, such a special definition will be expressly set forth in the specification in a definitional manner that directly and unequivocally provides the special definition for the term or phrase.

Generally, the present application describes embodiments of techniques for providing rate tiers for users or subscribers to services provided by a wireless communication system. Conventional service rate plans offer every user a simple menu (e.g., gold, silver, and basic plans) and each user selects from among the plans on offer. Higher-level plans are typically more expensive and promise higher bandwidth, throughput, and/or quality-of-service. However, as discussed herein, the actual bandwidth, throughput, and/or quality-of-service received by individual users can vary dramatically based upon factors such as the user's location, time of day, mix of wireless services, and the like. Some users may therefore feel that they are paying a premium price for a less than premium service, while the level of resources available to other users may far exceed their needs. Still other users could dramatically improve the performance of their requested services at a relatively small cost due to the availability of wireless resources in regions frequented by the user.

Embodiments of the techniques described in the present application may address these drawbacks in the conventional practice by providing mechanisms that allow service plans to be tailored to each user's geographic and/or temporal wireless resource usage patterns. In one exemplary embodiment, statistical representations of resource usage can be created for each user as a function of location using measurements of the user's resource usage at various locations within the coverage area of the wireless indication system. Billing rate tiers can then be defined for the users based on the statistical representation so that each rate tier offers a rate for a different level of resource usage. In another embodiment, call admission functions in the wireless communication system may determine whether to admit the requested call using an estimate of a resource margin for the user at their current location. The estimate is made based on the statistical representation of resource usage for the user. Service providers may also use the statistical representations for groups of users to determine whether to modify resource capacity of the wireless communication system by comparing the statistical representations to a geographical distribution of resource capacity of the wireless communication system.

Figure 1:
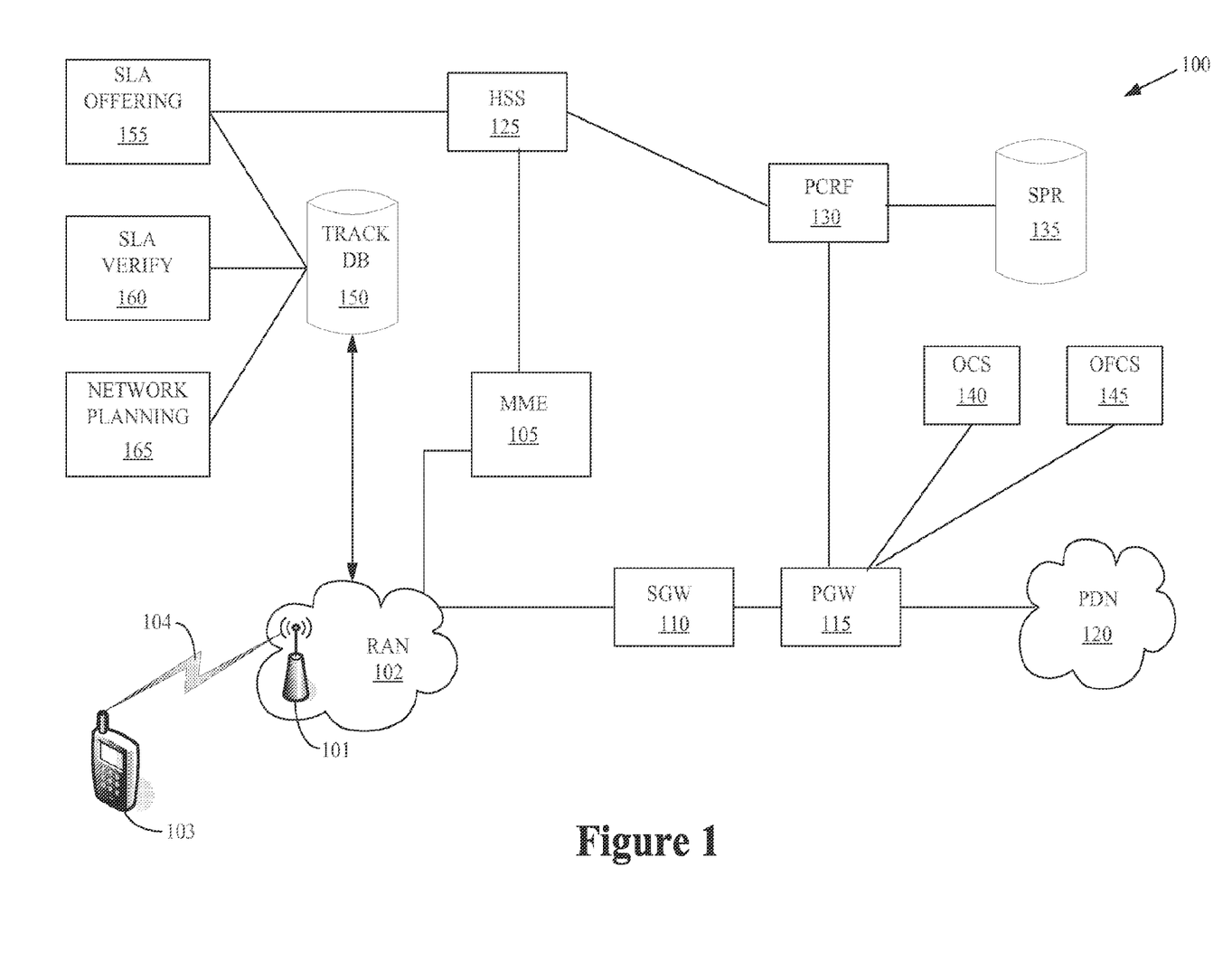
FIG. 1 conceptually illustrates a first exemplary embodiment of a wireless communication system.

FIG. 1 conceptually illustrates a first exemplary embodiment of a wireless communication system 100. In the illustrated embodiment, the wireless communication system 100 includes one or more base stations 101 that are part of a radio access network (RAN) 102 configured to provide wireless connectivity to one or more mobile units 103 over an air interface 104. Techniques for providing wireless connectivity are know in the art and in the interest of clarity only those aspects of these techniques that are relevant to the claimed subject matter will be discussed herein. The radio access network 102 is communicatively coupled to a mobility management entity (MME) 105, which is a control node for the radio access network 102 and may be configured to perform tasks such as user idle mode tracking and paging procedures, bearer activation/deactivation process, authenticating the user, and the like. The radio access network 102 is also communicatively and/or electronically coupled to a serving gateway 110 that performs tasks such as routing and forwarding user data packets, acting as the mobility anchor for the user, and the like. The serving gateway 110 is communicatively and/or electronically coupled to a packet data network gateway (PGW) 115, which provides connectivity from the mobile unit 102 to one or more external packet data networks (PDN) 120.

The illustrated embodiment of the wireless communication system 100 also includes a home subscriber server (HSS) 125, which is a master user databased that supports IMS network entities that handle calls. For example, the home subscriber server 125 may contain subscription-related information (subscriber profiles), perform authentication and authorization of the user, and/or provide information about the subscriber's location and IP information. The home subscriber server 125 is communicatively coupled to the mobility management entity 105 and a policy and charging rules function (PCRF) 130, which may be responsible for managing bandwidth, charging rates, and/or quotas within the wireless communication system 100. The PCRF 130 is communicatively and/or electronically coupled to a subscriber profile repository (SPR) 135, which stores subscriber profile information such as entitlements, rate plans, and the like.

The wireless communication system 106 may also include an online charging system (OCS) 140 to perform functions related to online charging and an off-line charging system (OFCS) 145 to perform functions related to off-line charging. For example, service providers may use offline and online billing functions to keep track of the charges incurred by each subscriber unit for using the various services provided by the service provider. The 3GPP standards group has defined a set of specifications that may be used to implement online charging systems and offline charging systems to cover charging in the various network domains (e.g., a circuit switching network domain, a packet switching network domain, and/or a wireless domain), IP multimedia subsystems, and emerging 3G application services. Offline charging is generally defined as a charging mechanism where charging information does not affect, in real-time, the service rendered. In offline charging, charging information for network resource usage is collected concurrently with that resource usage. Online charging is generally defined as a charging mechanism where charging information can affect, in real-time, the service rendered, and therefore a direct interaction of the charging mechanism with session/service control is needed. In online charging, charging information for network resource usage is collected concurrently with that resource usage in the same fashion as in offline charging. However, authorization for the network resource usage must be obtained by the network prior to the actual resource usage to occur.

The wireless communication system 100 includes a tracking database 150 that stores information correlating each user's resource usage to locations, paths, and/or usage times for each user. As used herein, the phrase "resource usage" will be understood to refer to the amount of resources of the wireless communication system 100 that are used by, consumed by, and/or allocated to a user to support wireless communication. The resource usage for a particular user may refer to measures of the total amount of resources consumed by the user to support all services and/or applications available to the user or alternatively the resource usage may be used to indicate the resources consumed to support a particular service/application or combination thereof. Exemplary measures of the user's resource usage include bandwidth consumed by or allocated to the user, uplink and/or downlink throughput, numbers or volumes of transmitted bytes, data rates, channels or codes allocated to the user, and the like. In one embodiment, the tracking database 150 (or other entity within the wireless communication system 100) can generate a statistical representation of resource usage for each user in the wireless communication system 100 as a function of location using measurements of the user's resource usage at a plurality of locations. For example, measurements of the metrics can be averaged and a standard deviation of the measurements from the average value can be determined. Other statistical measures may also be applied to the collected metric data.

The statistical representation can then be saved in the tracking database 150. Embodiments of the wireless communication system 100 may implement a user mobility tracking function that tracks (e.g., measures or instructs other entities to measure) the per user metrics. The user mobility tracking function may then store the per user metrics. The collected metrics can be correlated to the access locations for each connection and each user. For example, the radio access networks 102 can be configured to implement the user mobility tracking function. Exemplary metrics may include, but are not limited to, average radiofrequency (RF) resource (e.g., bandwidth) usage, RF condition (e.g., as indicated by the modulation and coding scheme (MCS) and/or channel quality information (CQI)), duration under coverage, user location (e.g. cell/sector ID, longitude/latitude) when connected, and/or user data usage such as volume and throughput when connected. Since mobile units 101 are in practice largely nomadic (vs. truly mobile), users on average follow a handful of deterministic paths in their daily routines. Both factors indicate that the statistical representations reflect meaningful averaging of the dynamic mobility tracking information collected by the user mobility tracking function.

In one embodiment, the statistical representations can be used to establish rate tiers. As used herein, the term "rate" will be understood to refer to a measure of the cost charged to a user for access to the wireless communication system 100. In different embodiments, the rate may be defined in different ways. For example, a billing rate may indicate a dollar (or other currency) amount that is charged every month to provide service to the user at the level specified by a service level agreement (SLA) for the associated tier. For another example, the rate may indicate a dollar amount that is charged to the user as a function of the resources consumed such as a dollar (or other currency) amount per increment of bandwidth, a dollar amount per transmitted uplink and/or downlink byte, and the like. Each rate tier indicates a rate that is charged for a particular level of resource usage or range of resource usages. Different rate tiers may be used to differentiate user experience across tiers over a wide array of applications and/or to promote incentive towards higher tiers. For examples, when the rate tiers indicate billing rates charged for a selected throughput or range of throughputs, the different tiers may be defined to satisfy the criterion:

$$\text{Prob}[R_{tierA} > M * R_{SLA\_tierB}] > N\%, \tag{1}$$

$$1 \leq M \leq R_{SLA\_tierA} / R_{SLA\_tierB}$$

where tierB is one tier lower than tierA, the billing rate for tierB is lower than the billing rate for tierA, $R_{tierA}$ is the actual realized connection throughput for tierA users, and $R_{tierB}$ is the actual realized connection throughput for tierB users. In this embodiment, $R_{SLA,tierX}$ is the service level agreement (SLA) data rate for tierX users and $R_{SLA,tierB} < R_{SLA,tierA}$. The parameters M, N can be varied according to design and/or implementation considerations. Enforcement of this criterion may be performed in the RAN 102 over the air interface 104 by making user of guaranteed bit rate (GBR) or GBR-like bearers with a guaranteed rate equal to target $R_{tier}$. In alternative embodiments, the rate tiers can be defined in terms of other resources or combinations of resources, such as bandwidth, quality-of-service, and the like.

The statistical representation stored in the tracking database 150 may be used to support call admission to the wireless communication system 100. In one embodiment, the radio access network 102 uses the statistical representations during call admission control procedures. For example, the radio access network 102 can access the statistical representation for the mobile unit 103 when it receives a request for a call from the mobile unit 103. The statistical representation can be used to estimate the resource margin required to admit the call while the mobile unit 130 is at its current location. For example, user mobility tracking information may provide RAN call admission with average RF resource usage (i.e. bandwidth) and condition (e.g., MCS, CQL, etc) of each user relevant to the access location, allowing the RAN 102 to minimize admission margin necessary to enforce the user target rate and thereby increase and/or maximize system capacity.

In one embodiment, the wireless communication system 100 includes a service-level agreement offering function 155 that can estimate the resource availability and potential range of service rates available to each user. For example, the SLA offering function 155 can estimate sensible and achievable SLAs that can be offered to each user. The wireless communication system 100 may then communicate this information to the user, e.g., over the air interface 104. For example, a user who signs up for low rate tier can be enticed to upgrade to higher tier if user tracking shows good properties along the user's typical paths. It may also be possible to offer location specific or location-based rate tier service for each user, e.g., a user may be offered high rate tier service at work and low rate tier service at home. However, persons of ordinary skill in the art having benefit of the present disclosure should appreciate that other embodiments may use the statistical representations to offer a variety of different location-dependent and/or time-dependent service plans including any number of rate tiers represent different definitions of the service levels. A verification function 160 may be used to verify that the offered SLAs are actually being provided (at least in an average or statistical sense) to the users in accordance with their agreements. For example, the verification function 160 may support verification of SLA by presenting all or part of user tracking data (or other information synthesized from this data) to operators and consumers.

Network planning may also be supported and/or enhanced using the information in the statistical representation of the user's resource usage. In one embodiment, a network planning function 165 can be communicatively and/or electronically coupled to the tracking database 150. The network planning function 165 may generate maps or distributions representing usage patterns for groups of users that access the wireless communication system. The maps or distributions can be compared to the geographic distribution of service capacity of the wireless communication system 100 to identify regions of overcapacity and/or under capacity. The network planning function 165 may use information retrieved from the tracking database to facilitate identification of regions where coverage or capacity may be improved, e.g., on a per rate-tier basis. For example, when high rate tier users are found to be concentrated along a path or in a region where the offered or promised target $R_{tier}$ cannot be satisfied, service providers may be informed that capacity or coverage expansion may be useful and/or profitable.

Figure 2:
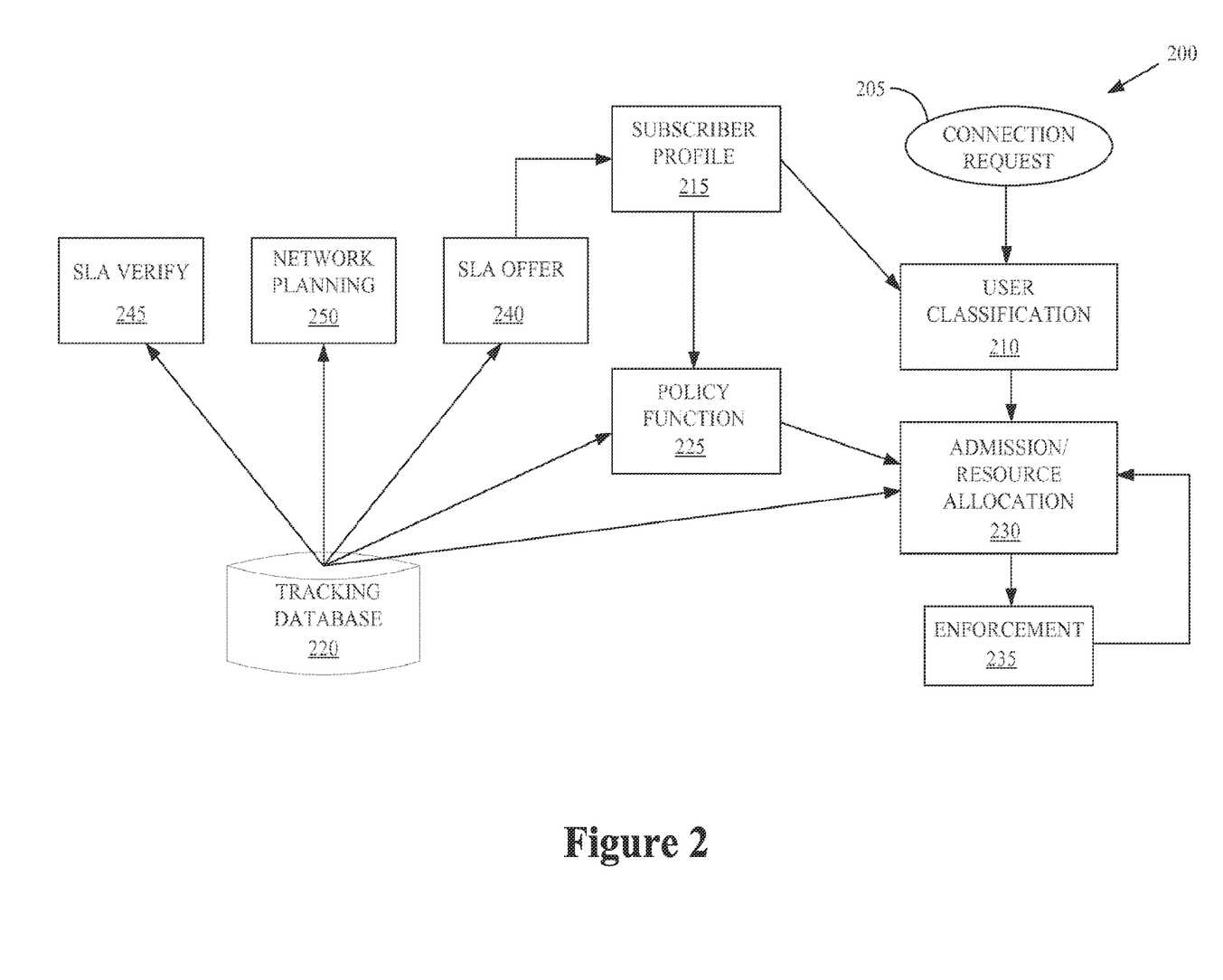
FIG. 2 conceptually illustrates a second exemplary embodiment of a wireless communication system.

FIG. 2 conceptually illustrates a second exemplary embodiment of a wireless communication system 200. In the second exemplary embodiment, communication pathways between elements of the wireless communication system 200 are shown and methods of operating the system 200 are illustrated. The user can request (at 205) access to the network, e.g., by transmitting a call admission request or an access request. The user can then be classified (at 210) using information stored in a subscriber profile 215. For example, the user's subscriber profile may indicate the SLA service tier currently allocated to the user. In one embodiment, the subscriber profile information may be retrieved from an HSS and conveyed to the RAN to use for admission control and/or tracking of the user. A statistical representation of the user's resource usage can also be conveyed from the user tracking database 220 to a policy function 225, such as a policy charging and rules function, which also receives subscriber profile information. The policy function 225 may use this information to generate and convey policy and/or charging rules to an admission control and resource allocation function 230, which may be implemented in the RAN. For example, a user tracking profile containing user's average RF resource usage, RF conditions, mobility, etc, may be retrieved from the tracking database 220 and conveyed to the RAN.

In the illustrated embodiment, the admission control and resource allocation function 230 in the RAN performs admission control and may admit the call using the user's average resource usage from user tracking profile to minimize the resource margin needed to support the user's target rate. In some cases, estimating the resource margin using the statistical representation of the user's resource usage may be critical for maximizing capacity to enable feasible service offers of a wide variety of services to a large number of users. For example, using a single assumed resource usage (such as a worst case usage scenario) for all users may cause the system to significantly overestimate resource consumption for requested calls and therefore reject an excessively large number of requested calls that could in fact be supported by the system. Once the call is admitted, an enforcement function 235 (which may be implemented in the RAN) can enforce user's target rate with an air interface scheduler that attempts to satisfy each admitted user's minimum or guaranteed bit rate (GBR) and/or maximum bit rate (MBR) constraints with and/or without congestion in the core. In one embodiment, the enforcement function 235 may throttle traffic according to user target rates when under core congestion. The enforcement function 235 in the RAN may also measure user connection statistics (e.g. average BW usage, average SINR/MCS/CQI, mobility metrics) and feed back this information, e.g., to the user tracking database 220 via the allocation function 230.

The user tracking database 220 may also be used to determine an achievable SLA offering (at 240); which may be sent back to the subscriber profile database 215 so that this information can be conveyed to the user when the user requests a connection. This information can also be used to offer different tiers to connected users and/or to provide information justifying the value of subscribing to a different tier, e.g., by generating and transmitting a message that is transmitted to the user over the air interface. In one embodiment, users may be able to respond to these messages with a request to upgrade to a different tier and the system may respond by modifying the appropriate user profiles and changing the service level for the user. Information in the user tracking database 220 can also enable SLA verification (at 245) and facilitate network planning/expansion (at 250).

Figure 3:
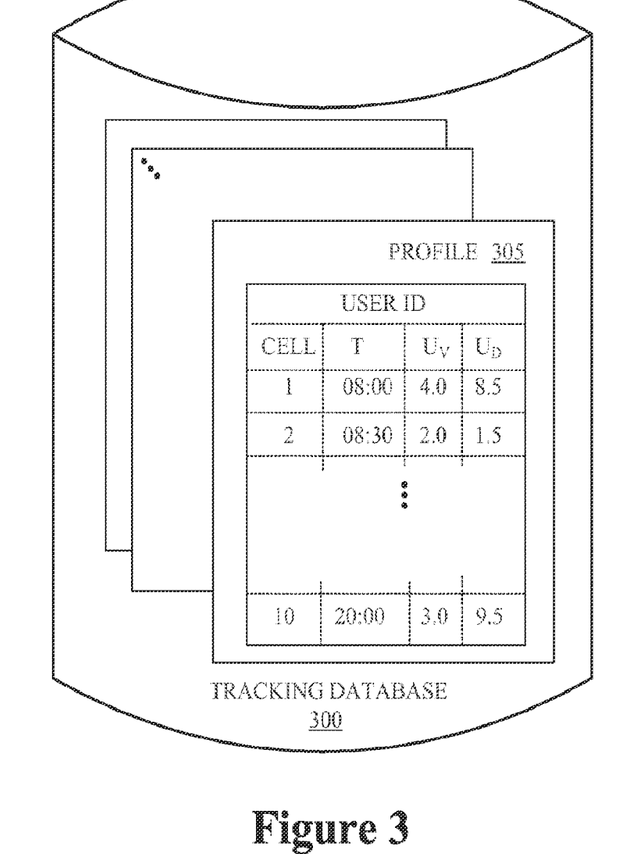
FIG. 3 conceptually illustrates one exemplary embodiment of a tracking database that may be implemented in the embodiments of the wireless communication system shown in FIGS. 1 and 2.

FIG. 3 conceptually illustrates one exemplary embodiment of a tracking database 300 that may be implemented in the embodiments of the wireless communication system 100, 200 shown in FIGS. 1 and 2. In the illustrated embodiment, the tracking database 300 is used to store one or more profiles 305 for individual users that utilize services or applications provided by the wireless communication system. The tracking database 300 may be implemented at a single location within the system or may be distributed over multiple locations throughout the system. The profile 305 is indexed by a user identifier and includes a statistical representation of the resource usage of this user. In the illustrated embodiment, the statistical representation correlates the cell identifier with the time of day (T) (or alternatively a range of times) that the user is typically found within the cell, an average usage of voice services ($U_V$) while the user is in the cell, and/or an average usage of data services ($U_D$) while the user is in the cell. Units for the usages are arbitrary and the numbers shown in FIG. 3 are only intended to illustrate how usage may possibly vary for different services in different cells at different times. Alternative embodiments of the statistical representation may use different correlations between the user's location and resource usage. For example, the user's location may be indicated by geographical coordinates (such as latitude and longitude) and the resource usage may be a total daily resource usage at the location and/or the resource usage rate when the user is at that location. In other alternative embodiments, other correlations may be computed between different quantities that represent the resource usage and/or the location of the user. Moreover, the usages may be associated with different services and/or applications so that per user per service usages can be calculated as a function of location and/or time.

Figure 4A:
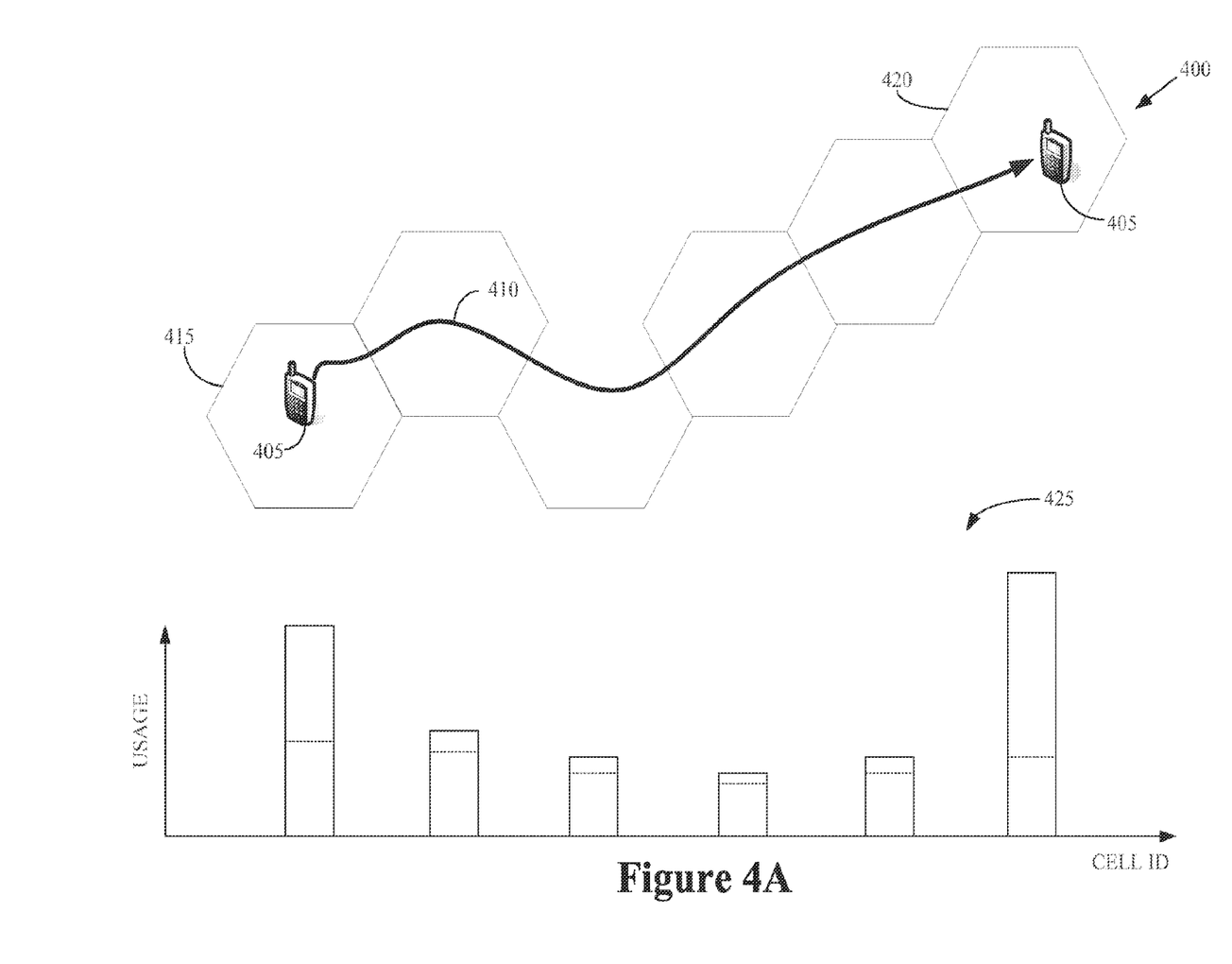
FIGS. 4A and 4B conceptually illustrate a third exemplary embodiment of a wireless communication system.

FIG. 4A conceptually illustrates a third exemplary embodiment of a wireless communication system 400. In the third exemplary embodiment, a user 405 may travel along a path 410 from a source cell 415 (such as a cell that includes the user's home) to a destination cell 420 (such as a cell that includes the user's workplace). The path 410 and the cells associated with the path 410 can be identified using statistical analysis of the travel patterns of the user 405 and each user 405 may be associated with more than one path 410. The system 400 can also measure metrics associated with the user 405 when it is connected to some or all of the cells along the path 410. For example, the system 400 can measure a statistical average of the resource usage for voice services and resource usage for data services. Other statistical measures, such as means, medians, modes, statistical deviations, likelihoods, probabilities, and the like may also be determined using the measured resource usage data. For example, the likelihood or probability that a particular call may require a particular level of resource usage can be calculated and used in conjunction with embodiments of the techniques described herein.

The user's resource usage can then be correlated with the cell identifier as indicated in the bar graph 425. In the illustrated embodiment, overall usage is highest in the source cell 415 and the destination cell 420. Usage for voice services (the lower box below the dashed line) and data services (the upper box above the dashed line) are also highest within the source cell 415 and the destination cell 420. Overall usage drops in the intermediate cells along the path 410, primarily because data usage drops significantly in the intermediate cells. Resource usage for voice communication also drops in the intermediate cells, but to a lesser degree than the drop in the data usage. Margins for call admission may then be set to lower values in the intermediate cells and higher values in the source cell 415 and the destination cell 420 to reflect the different patterns of resource usage. The user 405 may also be offered an individually tailored service plan that provides enhanced data resource availability in the source cell 415 and the destination cell 420, while reducing data resource availability (and associated costs) in the intermediate cells along the path 410.

Figure 4B:
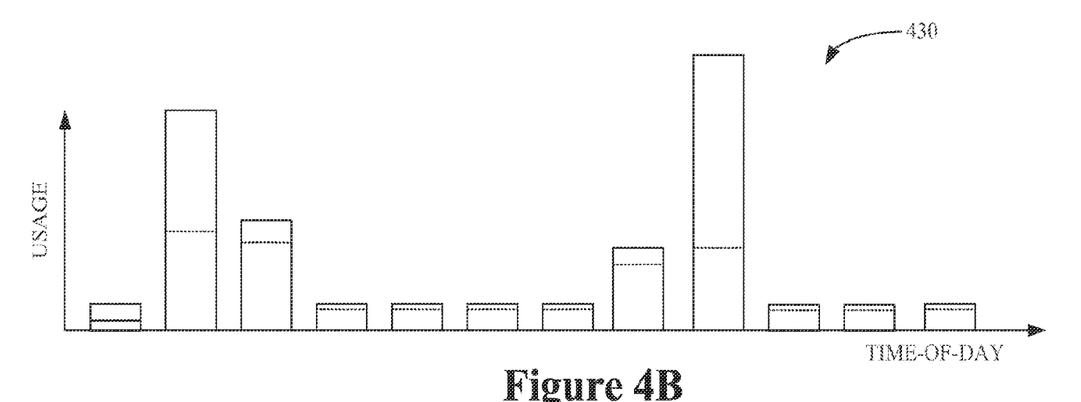

FIG. 4B conceptually illustrates a third exemplary embodiment of a wireless communication system 400. In the third exemplary embodiment, a bar graph 430 is used to so the temporal resource usage of the user 405 while in the source cell 415. Resource usage is divided into two hour intervals throughout the time of day. The user's resource usage can then be correlated with the difference time intervals throughout the day as indicated in the bar graph 430. In the illustrated embodiment, overall usage is highest in the source cell 415 in the mornings and evenings. Usage for voice services (the lower box below the dashed line) and data services (the upper box above the dashed line) are also highest at these times of day. Overall usage drops at night and during the day, probably because the user is not as likely to be at home during these time intervals or perhaps the user has access to a wired connection to the Internet and so is not as likely to use mobile services or uses a less resource-intensive mix of services during the time intervals. Margins for call admission may then be set to lower values during the low usage periods and higher values in the higher usage periods. The user 405 may also be offered as individually tailored service plan that provides enhanced resource availability in the mornings and evenings, while reducing data resource availability (and associated costs) at other times of the day.

Rate tiers and/or billing plans may also be established based on the user's resource usage patterns in different locations and/or at different times. For example, when a user is going to be only at one location, e.g. during a known or predetermined time interval, a statistical representation of the temporal variations in a user's resource usage at the location can be formed from metrics collected while the user is at that location and used to represent the user's likely temporal pattern of resource usage or consumption when in that location. If the user can be at one of two or more locations, e.g. the user could be at one of N different locations (where $N \geq 1$) during other time intervals or at a subsequent time, a new combined statistical representation can be formed to represent the user's likely pattern of resource usage or consumption when in these locations. In one case, the combined statistical representation may be an average of metrics collected at the multiple locations. Alternatively, the user can establish a separate or a decomposed statistical sub-representation for one or more location subsets. For instance, a location subset could be an area in the vicinity of a user's home and another location subset could be an area in the vicinity of the user's office. In that case, the user may have different profiles stored in the tracking database (one for each location subset) and the appropriate profile can be selected and/or accessed based on estimating the user's location, e.g., geographical coordinates provided by a GPS system associated with the user. Different service levels and different billing rate tiers can therefore be provided in each of the location subsets.

In one embodiment, the total cost or the effective billing rate for a billing cycle may be determined based on the relative time and/or resource usage in each location subset and/or over each time interval associated with each profile. For example, the user's time occupancy in each location subset can be used to form a time weighted average (weights adding to one) of the rate tiers corresponding to each service level and the time-weighted average can be used to calculate the user's bill for the billing cycle. In other words, each rate tier may be discounted based on the fractional proportion of time spent in each location subset. The discount or weight calculation could also be simplified to be static (e.g., 50% discount for each profile in the two location profile example) or discounts may not be applied at all, e.g., the weights may be set to unity for each profile so that the subscriber effectively appears as N independent users that are each accorded his/her own tier and each pays the full (undiscounted) price in their respective tiers. The special case of N=1 is when a single combined statistical representation is used to represent the universe of locations that the user can be in within the system. Other examples of selected groups of locations are particular sets of cells or frequently traveled paths.

Figure 5:
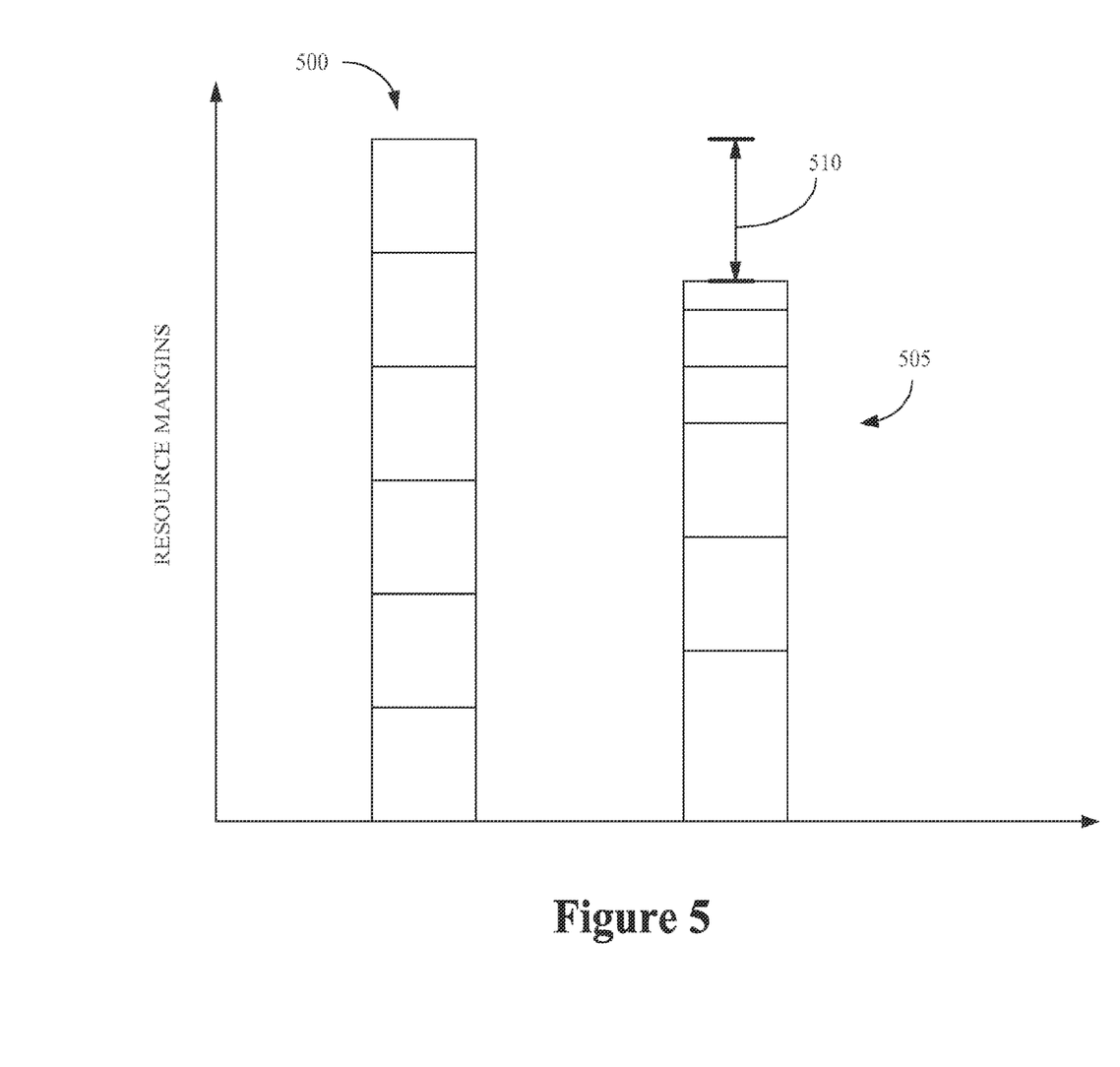
FIG. 5 conceptually illustrates a comparison of resource margins used for call admissions in a conventional system and in embodiments of the wireless communication systems described herein.

FIG. 5 conceptually illustrates a comparison of resource margins used for call admissions in a conventional system and in embodiments of the wireless communication systems described herein. In both cases, the system is processing six call admission requests and so the system needs to estimate the resource margin to provide an estimate of what resources may need to be allocated to support the requested calls. The conventional system sets the resource margins for each of the calls at the same value, which is typically a large or worst-case scenario value. The conventional system therefore estimates the resources needed to admit the calls at the level indicated by the boxes 500. In contrast, embodiments of the techniques described herein allow the system to estimate resource margins based upon the statistical representation of the actual resource usage of each individual user at the location (and possibly time) of the current access request. The estimated resource margins 505 may therefore be lower or higher than the resource margins estimated for the same users by the conventional system. However, the conventional system typically assumes a worst-case scenario and so on average the resource margins 505 estimated based on the actual resource usage of the individual users may be lower than the resource margins 500 used in the conventional system by an amount 510 shown in FIG. 5. Although in some embodiments or situations the resource margins 505 may be larger than the resource margins 500, this is still advantageous because it is a more accurate representation of the likely resource usage for the requested calls.

Figure 6:
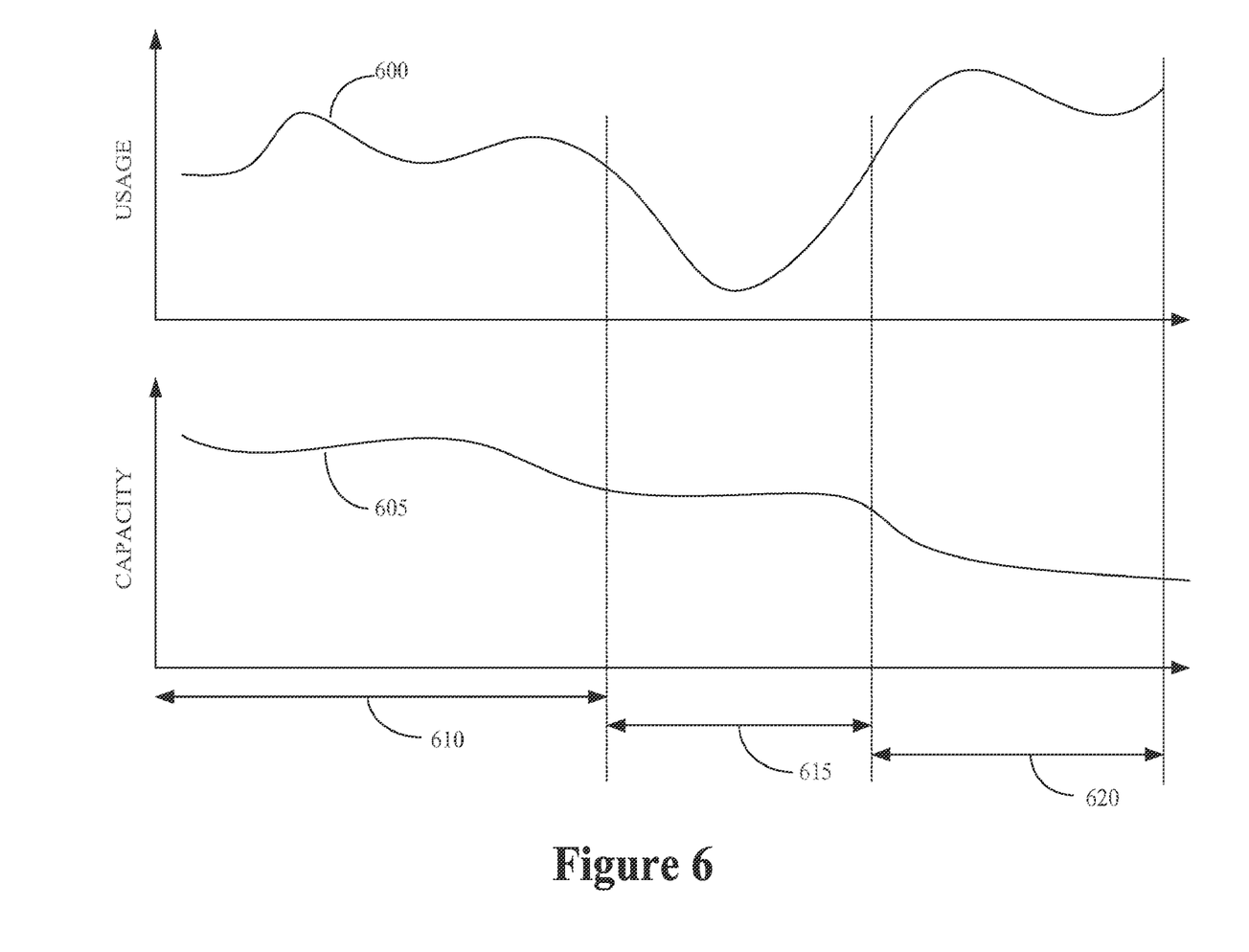
FIG. 6 conceptually illustrates distributions of resource usage and system capacity for one exemplary embodiment of a wireless communication system.

FIG. 6 conceptually illustrates distributions of resource usage 600 and system capacity 605 for one exemplary embodiment of a wireless communication system. The distributions 600, 605 are measured in arbitrary units and are plotted as a function of distance along one direction. However, persons of ordinary skill in the art having benefit of the present disclosure should appreciate that alternative embodiments may plot the distributions 600, 605 in any number of dimensions including but not limited to two spatial dimensions and one temporal dimension. In the illustrated embodiment, the distribution 600 of resource usage is generated by combining the statistical representations of resource usage for a selected group of users that have been (or are currently) connected to the wireless communication system. For example, individual user information in the profiles stored in a tracking database can be merged or combined to generate the distribution 600. The system capacity 605 can be determined using a variety of methods including theoretical predictions, empirical relations, a pre-existing map created using drive-by testing during deployment of the system, a map created using measurements performed by users in the system, and the like.

Comparison of the distributions 600, 605 can be used to facilitate network planning. For example, although there are some variations, the network capacity 605 and the usage 600 are basically comparable and approximately correlated within the region 610. Consequently, it may not be necessary or advisable to modify the system capacity in this region as long as the overall resource availability and/or quality of service experienced by each user is acceptable. Resource usage 600 falls significantly in the region 615 while the system capacity 605 declines to a slightly lower level than in the region 610. The region 610 may therefore be a good candidate for operator cost savings by reducing system capacity to correspond approximately to the resource usage 605 in the region 610. Resource usage 600 rises dramatically in the region 620 while the system capacity 605 continues to decline. The region 620 may therefore be a good candidate for increasing system capacity 605, e.g., by deploying more base stations and/or increasing the capacity of the existing base stations.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above row be altered or modified and all such variations are considered within the scope of the disclosed subject matter. Accordingly, the protection sought herein is as set forth in the claims below.

What is claimed:

1. A method for implementation in a wireless communication system, comprising:
   accessing, at a network element in the wireless communication system, a statistical representation of resource usage for a user, wherein the statistical representation is determined based on measurements of the user's resource usage at a plurality of locations;
   receiving, at the network element, a request to admit a call from a user at a current location in the plurality of locations;
   estimating, at the network element, a resource margin required to admit the call from the user at the current location based on the statistical representation; and
   determining, at the network element, whether to admit the call based on the estimate of the resource margin.

2. The method of claim 1, wherein determining whether to admit the call comprises comparing the estimate of the resource margin for the user at the current location to a geographic distribution of resource capacity of the wireless communication system.

3. The method of claim 2, wherein determining whether to admit the call comprises admitting the call when a resource usage at the current location plus the estimate of the resource margin for the user at the current location is less than a resource capacity at the current location.

4. The method of claim 3, comprising measuring the user's resource usage for the admitted call at one or more locations and modifying the statistical representation of resource usage for the user based on the measurements.

5. The method of claim 4, wherein measuring the user's resource usage comprises measuring at least one of the user's bandwidth when connected at the one or more locations, the user's channel condition when connected at the one or more locations, a cell or sector identifier of the one or more locations, coordinates of the user when connected at the one or more locations, or the user's data volume or throughput when connected at the one or more locations.

6. The method of claim 4, comprising modifying at least one of a plurality of rate tiers based on the modified statistical representation and conveying information indicating said at least one modified rate tier to the user.

7. The method of claim 6, comprising changing the rate tier of the user when the user requests a different rate tier in response to receiving said information indicating said at least one modified rate tier.

8. The method of claim 4, comprising combining the modified statistical representation of the user's resource usage with statistical representations of other users' resource usage to modify a map of resource usage as a function of location.

9. The method of claim 8, comprising determining whether to modify resource capacity by comparing the modified map of resource usage to a geographic distribution of resource capacity.

10. An apparatus, comprising:
    a network element for a wireless communication system, said network element comprising a processor configured to:
      access a statistical representation of resource usage for a user, wherein the statistical representation is determined based on measurements of the user's resource usage at a plurality of locations;
      receive a request to admit a call from a user at a current location in the plurality of locations;
      estimate a resource margin required to admit the call from the user at the current location based on the statistical representation; and
    determine whether to admit the call based on the estimate of the resource margin.

11. A non-transitory computer readable medium embodying a set of executable instructions, the set of executable instructions to manipulate at least one processor to:
    access a statistical representation of resource usage for a user, wherein the statistical representation is determined based on measurements of the user's resource usage at a plurality of locations;
    receive a request to admit a call from a user at a current location in the plurality of locations;
    estimate a resource margin required to admit the call from the user at the current location based on the statistical representation; and
    determine whether to admit the call based on the estimate of the resource margin.

* * * * *